(12) United States Patent
Leppert

(10) Patent No.: US 9,311,344 B2
(45) Date of Patent: Apr. 12, 2016

(54) SYSTEM AND METHOD FOR UNIVERSAL STORAGE AND PRESENTATION OF DATA

(71) Applicant: Christian P. Leppert, Dallas, TX (US)

(72) Inventor: Christian P. Leppert, Dallas, TX (US)

( * ) Notice: Subject to any disclaimer, the term of this patent is extended or adjusted under 35 U.S.C. 154(b) by 0 days.

(21) Appl. No.: 14/461,980

(22) Filed: Aug. 18, 2014

(65) Prior Publication Data

US 2014/0358851 A1    Dec. 4, 2014

Related U.S. Application Data

(63) Continuation of application No. 13/862,798, filed on Apr. 15, 2013, now Pat. No. 8,812,477, which is a continuation of application No. 12/426,757, filed on Apr. 20, 2009, now Pat. No. 8,442,966.

(60) Provisional application No. 61/046,233, filed on Apr. 18, 2008.

(51) Int. Cl.
*G06F 17/00* (2006.01)
*G06F 17/30* (2006.01)
*H04L 12/24* (2006.01)

(52) U.S. Cl.
CPC .... *G06F 17/30289* (2013.01); *G06F 17/30061* (2013.01); *G06F 17/30905* (2013.01); *H04L 41/22* (2013.01)

(58) Field of Classification Search
CPC ............. G06F 17/30864; G06F 17/30; G06F 17/30867; G06F 17/3053; G06F 17/30241; G06F 17/30554; G06F 17/3064; G06F 17/3087; G06F 17/30011
USPC ......................................... 707/706
See application file for complete search history.

(56) References Cited

U.S. PATENT DOCUMENTS

2004/0205380 A1   10/2004   Black
2009/0249453 A1*  10/2009   Cluck et al. ........... 726/5

* cited by examiner

*Primary Examiner* — Truong Vo
(74) *Attorney, Agent, or Firm* — Winstead PC

(57) ABSTRACT

A method includes receiving, on an electronic device, one or more logical entities from a storage system having a universe of data. The one or more logical entities encapsulate data from the universe of data on the storage system. Each of the one or more logical entities belong to one of a plurality of logical-entity types defined by a universal representation format. The method additionally includes, for each of the one or more logical entities, rendering a representation of the logical entity on a spatial interface, the spatial interface comprising a plurality of spatial components.

14 Claims, 9 Drawing Sheets

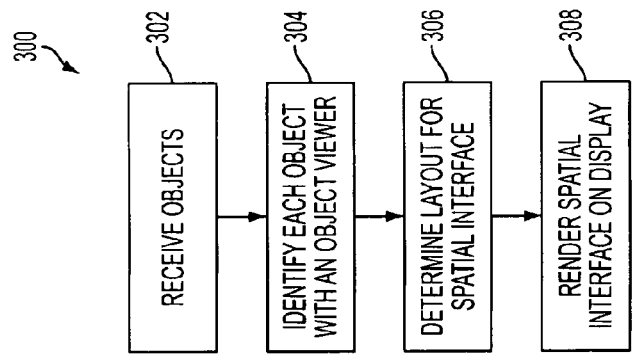
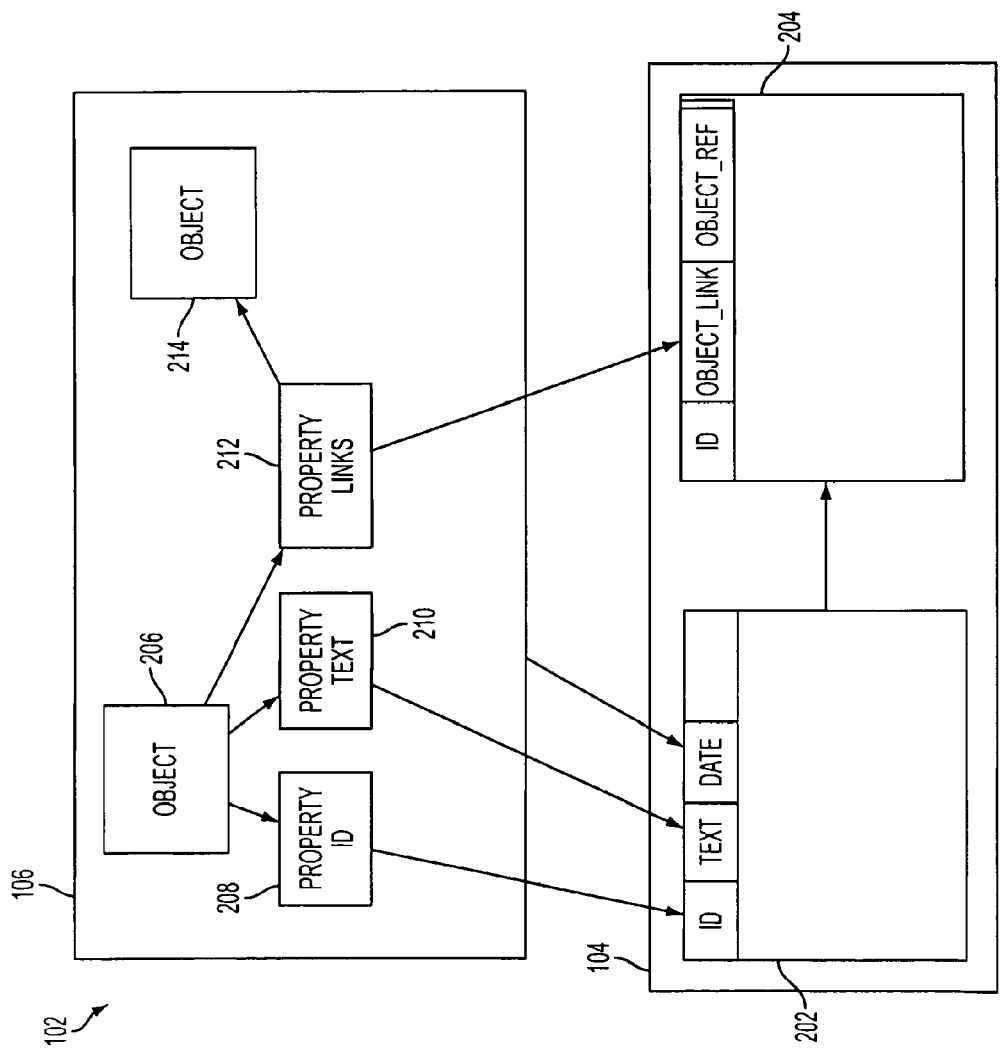

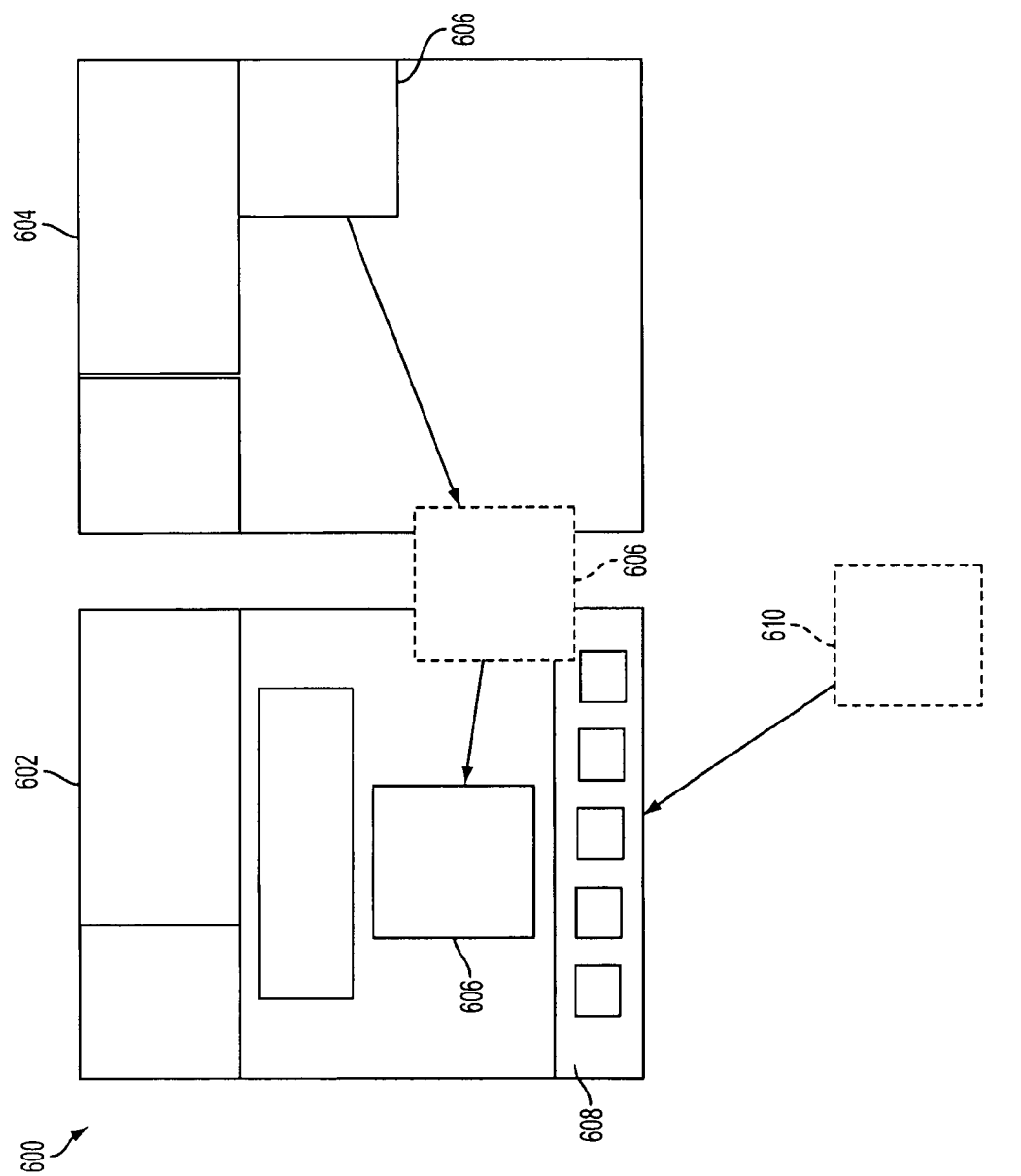

SYSTEM AND METHOD FOR UNIVERSAL STORAGE AND PRESENTATION OF DATA

CROSS-REFERENCE TO RELATED APPLICATIONS

This patent application is a continuation of, and incorporates by reference the entire disclosure of, U.S. patent application Ser. No. 13/862,798. U.S. Patent Application No. is a continuation of U.S. patent application Ser. No. 12/426,757, which is now U.S. Pat. No. 8,442,966. U.S. patent application Ser. No. 12/426,757 claims priority from U.S. Provisional Patent Application No. 61/046,233, filed Apr. 18, 2008. This patent application incorporates by reference the entire disclosure of U.S. Pat. No. 8,442,966 and U.S. Provisional Patent Application No. 61/046,233.

BACKGROUND

1. Technical Field

This patent application relates generally to data organization and presentation, and more particularly, but not by way of limitation, to systems and methods for universal presentation of data.

2. History of Related Art

Traditionally, the Internet was viewed as a type of collaboration mechanism for exchanging existing content among individual computers. In the same way, data sharing occurred among applications rather than as atomic units of data that reside on the Internet. More recently, cloud computing has been developed in attempts to address some of these problems.

Cloud computing focuses on transforming the concept of computing from a desktop-centric environment, where data is stored and managed locally, to a data-cloud environment that enables data access from any location. Instead of being constrained by limitations regarding where data is located on a network, a data cloud allows any piece of data to be accessible anywhere on any connected device. However, with both web and desktop applications, there are problems with how this cloud-like data is presented and managed by prior art user interfaces. Prior art methods of displaying cloud-like data can generally be classified into one of two categories. One can structure the data very generically inside of web pages that are managed by a containing application, such as hyper-text documents that are managed by a web browser, or one can provide a hard-coded representation of the data using, for example, widgets, as in desktop applications.

Due to structuring of the cloud-like data in terms of either generic representations or inflexible widgets, a user interface has no understanding of the underlying nature of the content. The means of manipulating and accessing data is only relevant to a specific type of data that the user interface supports. There is no way to have the user interface, regardless of how capable the data platform is, use the data outside of the interface or even for the data to be understood outside of a context in which it resides. Moreover, any additional piece of data can only be used in the context of the limited mechanisms provided by the interface.

SUMMARY OF THE INVENTION

In one embodiment, a method includes maintaining, via at least one computer, a universe of data, the universe of data being accessible as a plurality of logical entities that each belong to one of a plurality of logical-entity types. The plurality of logical-entity types are defined by a universal representation format. The method also includes transmitting one or more of the plurality of logical entities to an interface application for rendering on a user interface according to the universal representation format, the interface application being configured according to the universal representation format. Additionally, the method includes receiving, from the interface application, at least one manipulation for at least one logical entity in the one or more logical entities and updating, via the at least one computer, the maintained universe of data and the at least one logical entity in the one or more logical entities responsive to the receiving step.

In another embodiment, a system includes a data store that stores a universe of data and a computing device. The computing device executes instructions to maintain the universe of data, the universe of data being accessible as a plurality of logical entities that each belong to one of a plurality of logical-entity types, the plurality of logical-entity types being defined by a universal representation format. The computing device additionally executes instructions to transmit one or more of the plurality of logical entities to an interface application for rendering on a user interface according to the universal representation format, the interface application being configured according to the universal representation format. Furthermore, the computing device executes instructions to receive, from the interface application, at least one manipulation for at least one logical entity in the one or more logical entities and to update the maintained universe of data and the at least one logical entity in the one or more logical entities responsive to the receipt of the at least one manipulation.

In yet another embodiment, a method includes receiving, on an electronic device, one or more logical entities from a storage system having a universe of data. The one or more logical entities encapsulate data from the universe of data on the storage system. Each of the one or more logical entities belong to one of a plurality of logical-entity types defined by a universal representation format. The method additionally includes, for each of the one or more logical entities, rendering a representation of the logical entity on a spatial interface, the spatial interface comprising a plurality of spatial components.

In still another embodiment, a system comprises an electronic device. The electronic device executes instructions to receive one or more logical entities from a storage system having a universe of data. The one or more logical entities encapsulate data from the universe of data on the storage system. Each of the one or more logical entities belong to one of a plurality of logical-entity types defined by a universal representation format. Additionally, the electronic device executes instructions, for each of the one or more logical entities, to render a representation of the logical entity on a spatial interface, the spatial interface comprising a plurality of spatial components.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 2 illustrates an embodiment of an object storage system and a data store;

FIG. 3A illustrates a process flow for an embodiment of a spatial interface application;

FIG. 6 illustrates an exemplary spatial interface;

DETAILED DESCRIPTION OF DRAWINGS

Various embodiments of the invention utilize a system and method for universally displaying data that offer numerous advantages over the prior art. One of ordinary skill in the art will recognize that data may be valuable for many purposes. For example, a digital photograph may be utilized by email, social networking, and instant-messaging services. In various embodiments, it is advantageous to develop a universal representation format for centrally storing data and to utilize the universal representation format to spatially arrange data in a spatial interface with a plurality of spatial components. The universal representation format may be usable, for example, in a cloud-computing environment. The spatial interface, via the spatial components, may access and present the data according to the universal representation format and provide a mechanism for the data to be explored and manipulated by a user.

As used herein, the term universal representation format refers to a data model that provides for a single representation of data that is independent of any specific use or purpose for the data being represented. Additionally, as used herein, the term spatial component refers to a user-interface component that is configured to display data according to the universal representation format. Further, the term spatial interface as used herein refers to a user interface that utilizes a plurality of spatial components to display data according to the universal representation format.

Figure 1B:
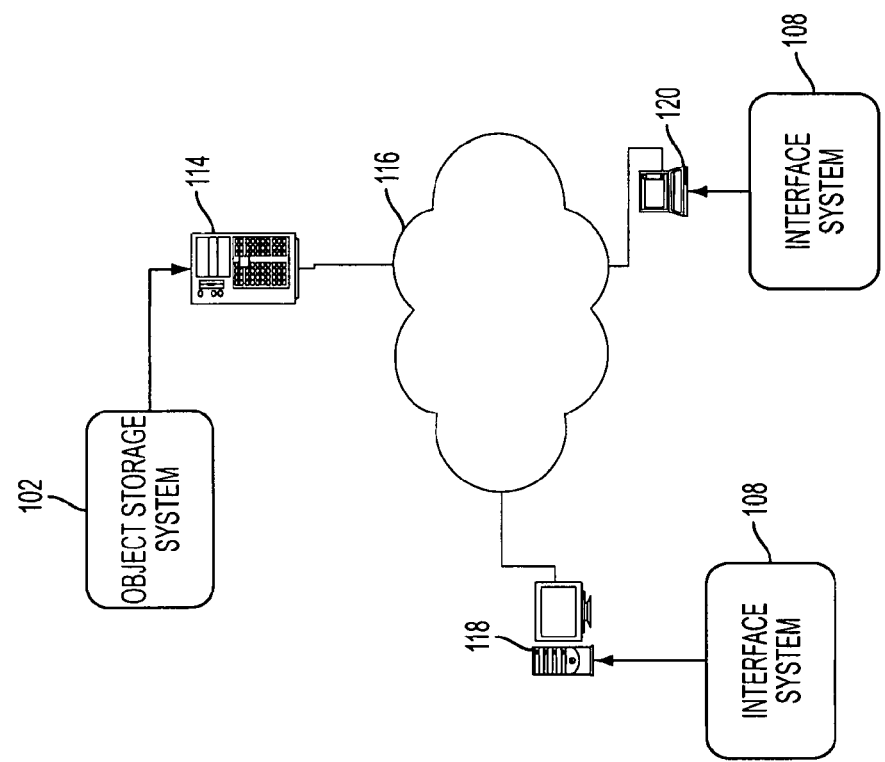
FIG. 1B is a diagram illustrating an embodiment of an object storage system and a data store in a network environment.
Figure 1A:
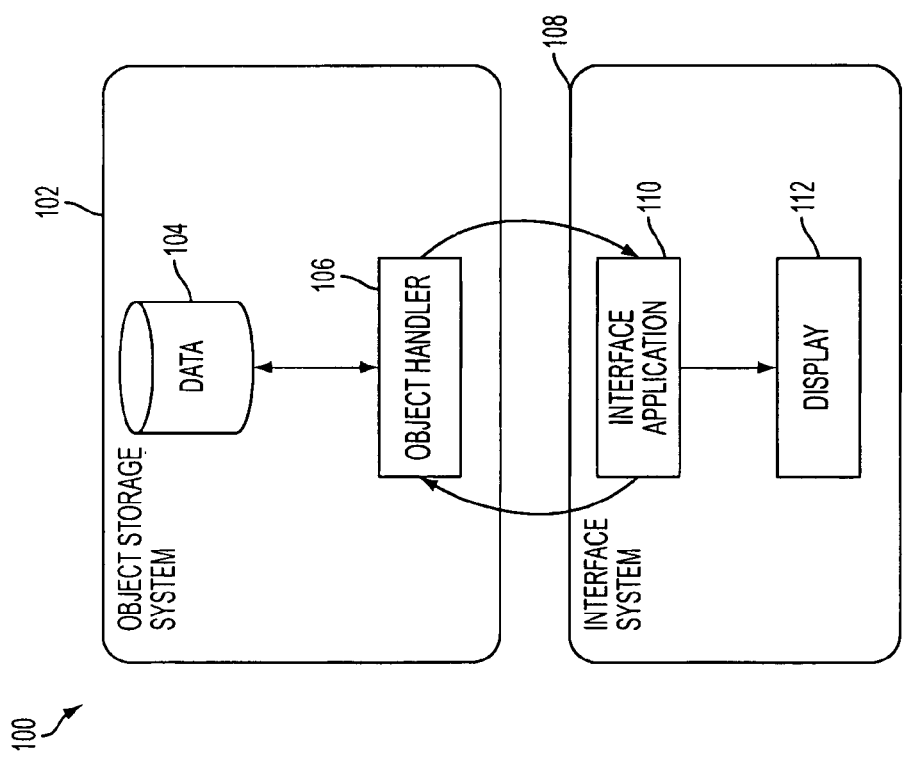
FIG. 1A is a diagram of a system for universal presentation of data.

FIG. 1A is a diagram of a system 100 for universal presentation of data. The system 100 includes an object storage system (OSS) 102 and a spatial interface system 108. In the OSS 102, a data store 104 maintains and stores a universe of data and provides data access to an object handler 106. The universe of data encompasses all of the data in the data store 104. Although the data store 104 is shown singly, it is contemplated that, in various embodiments, the data store 104 may represent an aggregation of data stored in multiple locations. The object handler 106 interprets and maps the universe of data in the data store 104 to objects according to a universal representation format. An object, as used herein, refers to a logical data unit defined by the universal representation format and comprises, for example, logically-related data stored in the data store 104.

A spatial interface application 110 of the spatial interface system 108 requests and receives one or more objects from the object handler 106 and renders object content for the received objects on a display 112. The object content includes properties for the one or more objects, which will be discussed further below. The display 112 may be operationally coupled, for example, to a computer, smartphone, personal digital assistant (PDA) and the like.

The object handler 106 maintains information on the universal representation format and, consequently, is aware of a plurality of object types permitted by the universal representation format, each of which is defined by a plurality of properties. The object handler 106 manages a universe of objects that each belong to one of the plurality of object types. Via the universe of objects, the object handler 106 maintains an object-oriented representation of the data store 104 in conformance with the universal representation format. In this manner, the spatial interface application 110 is able to request and receive objects from the object handler 106 using, for example, an application programming interface (API).

FIG. 1B is a diagram illustrating an embodiment of the OSS 102 and the spatial interface system 108 in a network environment. In the illustrated embodiment, the OSS 102 resides on a computer server 114 and one or more clients such as, for example, client 118 and client 120 have operating thereon the spatial interface system 108. Client 118 and client 120 communicate with the OSS 102 over a network 116 such as, for example, the Internet. Although the computer server 114 is depicted in FIG. 1B as a single server, it is also contemplated that, in other embodiments, there may be more than one such server operating in a distributed system.

FIG. 2 illustrates in further detail the OSS 102. According to the universal representation format, an object 206 of the object handler 106 has one or more properties that define the object 206. The object 206 is shown with identification property 208, text property 210, and links property 212. A database table 202 and a links table 204 are shown within the data store 104. The identification property 208 and the text property 210 are shown to be mapped to fields in the database table 202 while the links property 212 is shown to be mapped to the links table 204. An object 214 is illustrated as being related to the object 206 via the links property 212.

Still referring to FIG. 2, in a typical embodiment, the data store 104 stores the universe of data, for example, in a relational database. Database tables, such as, for example, the database table 202, house the universe of data that the object handler 106 maps to one of the plurality of object types defined by the universal representation format. In various embodiments, a separate database table, such as, for example, the database table 202, may be utilized to represent each of the plurality of object types, with rows corresponding to objects and the columns corresponding to properties. For example, according to the universal representation format, the object 206 has object content that includes the identification property 208, the text property 210, and the links property 212. Accordingly, the identification property 208 and the text property 210 are shown mapped to corresponding fields in the database table 202.

Still referring to FIG. 2, the links property 212, however, belongs to a distinct class of property, referred to herein as a relation property, that is handled differently by the object handler 106. In a typical embodiment, the data for the relation property is gathered from a links table 204 that is distinct from database tables such as the database table 202 described above. As illustrated, the links table 204 has a row for each object that includes an identification for each object, such as the identification property 208, and a link and reference to each object that is deemed related to the object 206 such as, for example, the object 214. Although storage is discussed herein relative to tables in a relational database, it is contemplated that many other storage methodologies may be used without departing from the spirit and scope of the invention.

FIG. 3A shows a flow 300 for initial operation of the spatial interface application 110 relative to FIG. 1. At step 302, the spatial interface application 110 receives objects from the object handler 106. The spatial interface application 110 is configured to operate according to the universal representation format and, as a result, is able to seamlessly request and receive objects from the object handler 106. From step 302, execution proceeds to step 304. At step 304, the spatial interface application 110 identifies each object received in step 302 with one of a plurality object viewers having a matching object type. An object viewer, as used herein, is a spatial component that is configured to display a particular object type defined by the universal representation format. In a typical embodiment, the plurality of object viewers identified with the received objects are represented in a stack of object viewers, as will be apparent to one of ordinary skill in the art.

From step 304, execution proceeds to step 306. At step 306, the spatial interface application 110 determines a layout of the object viewers on a spatial interface. The spatial interface application 110 retrieves object viewers, for example, from the stack of object viewers and individually places the object viewers in the layout. The process of determining the layout will be described in more detail below. From step 306, execution proceeds to step 308. At step 308, the spatial interface renders the spatial interface on a display, such as the display 112 of FIG. 1. After step 308, the process 300 ends.

Figure 3B:
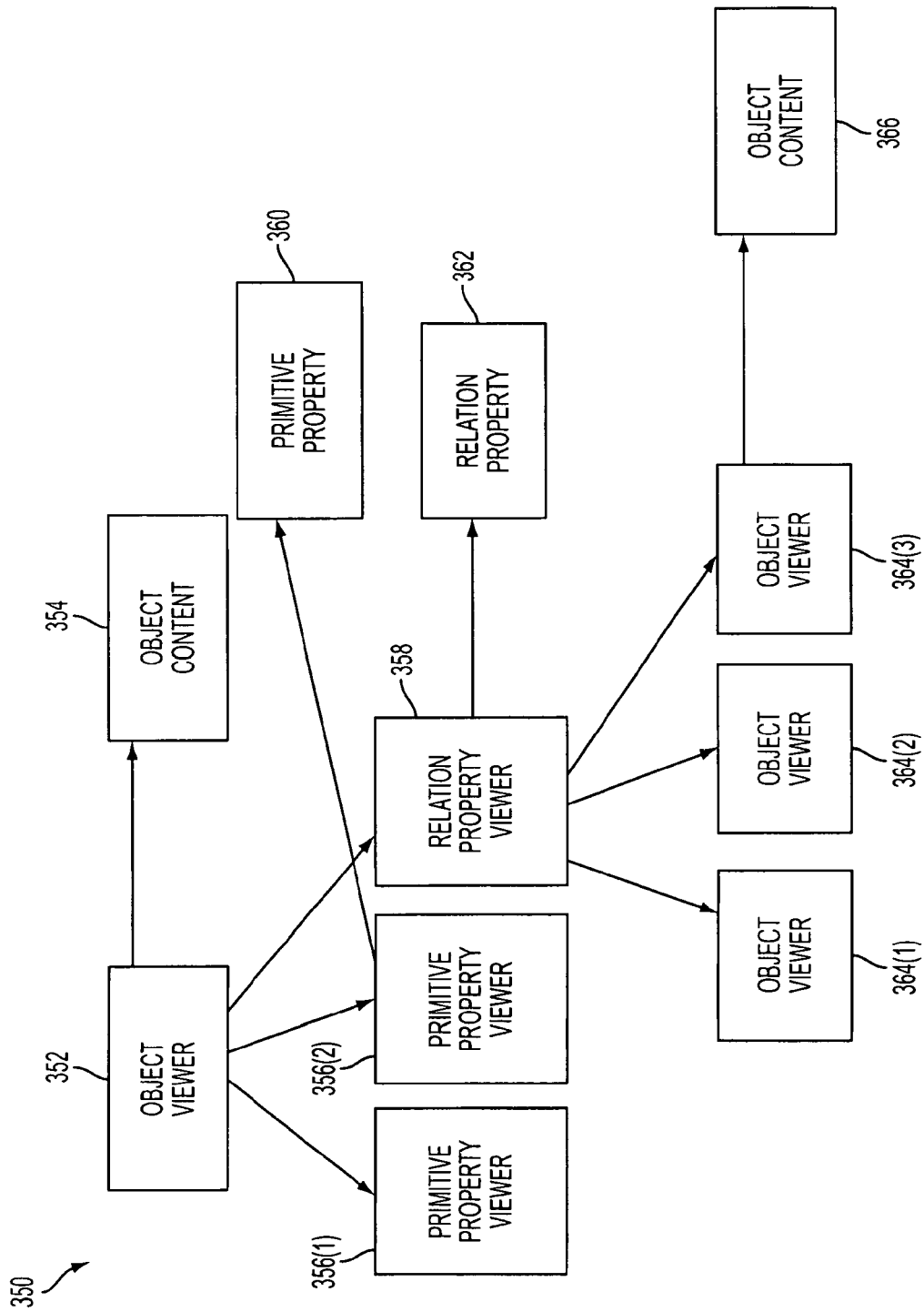
FIG. 3B illustrates a hierarchy of spatial components.

FIG. 3B illustrates a hierarchy 350 of spatial components for use in the spatial interface. Generally, only object viewers are placed directly on the spatial interface and thus a top-level object viewer 352 forms the top of the hierarchy 350. The top-level object viewer 352 represents an object viewer that is placed directly on the spatial interface and is not embedded within another spatial component. Thus, the top-level object viewer 352 is considered to be in a top-level context. The top-level object viewer 352 is additionally identified with an object in the manner described above with respect to FIG. 3A. Primitive property viewers 356(1) and 356(2) and a relation property viewer 358 are embedded within the top-level object viewer 352 in order to display primitive properties such as, for example, primitive property 360 and a relation property 362, respectively. Furthermore, object viewers 364(1), 364(2), and 364(3) are embedded within the relation property viewer 358 in order to display object content such as, for example, object content 366 in the embedded context.

Still referring to FIG. 3B, as illustrated, the top-level object viewer 352 includes object content 354, the primitive property viewers 356(1) and 356(2) include primitive properties such as, for example, primitive property 360, and the relation property viewer 358 includes the relation property 362. Additionally, object viewers 364(1), 364(2), and 364(3) include, for example, object content 366. It should be noted that the relation property 362 includes object content 366. It should further be noted that the object content 354 includes primitive property 360 and the relation property 362. Therefore, the top-level object viewer 352 utilizes the primitive property viewers 356(1) and 356(2) and the relation property viewer 358 in order to display the object content 354.

In a typical embodiment, the primitive property viewers 356(1) and 356(2) are utilized in the spatial interface to display primitive data within the top-level object viewer 352. Primitive data, in contrast to an object, is basic data such as text, numbers, dates, and the like that can be easily stored and accessed without the use of special abstractions. While the primitive property viewers 356(1) and 356(2) do not typically embed other spatial components, the relation property viewer 358 is utilized to represent relationships with other objects and, therefore, the object viewers 364(1), 364(2), and 364(3) are shown to be embedded within the relation property viewer 358. Therefore, the object viewers 364(1), 364(2), and 364(3) are considered to be in an embedded context. In that way, objects identified with the object viewers 364(1), 364(2), and 364(3) may be indicated to be related to the object identified with the top-level object viewer 352.

Figure 4:
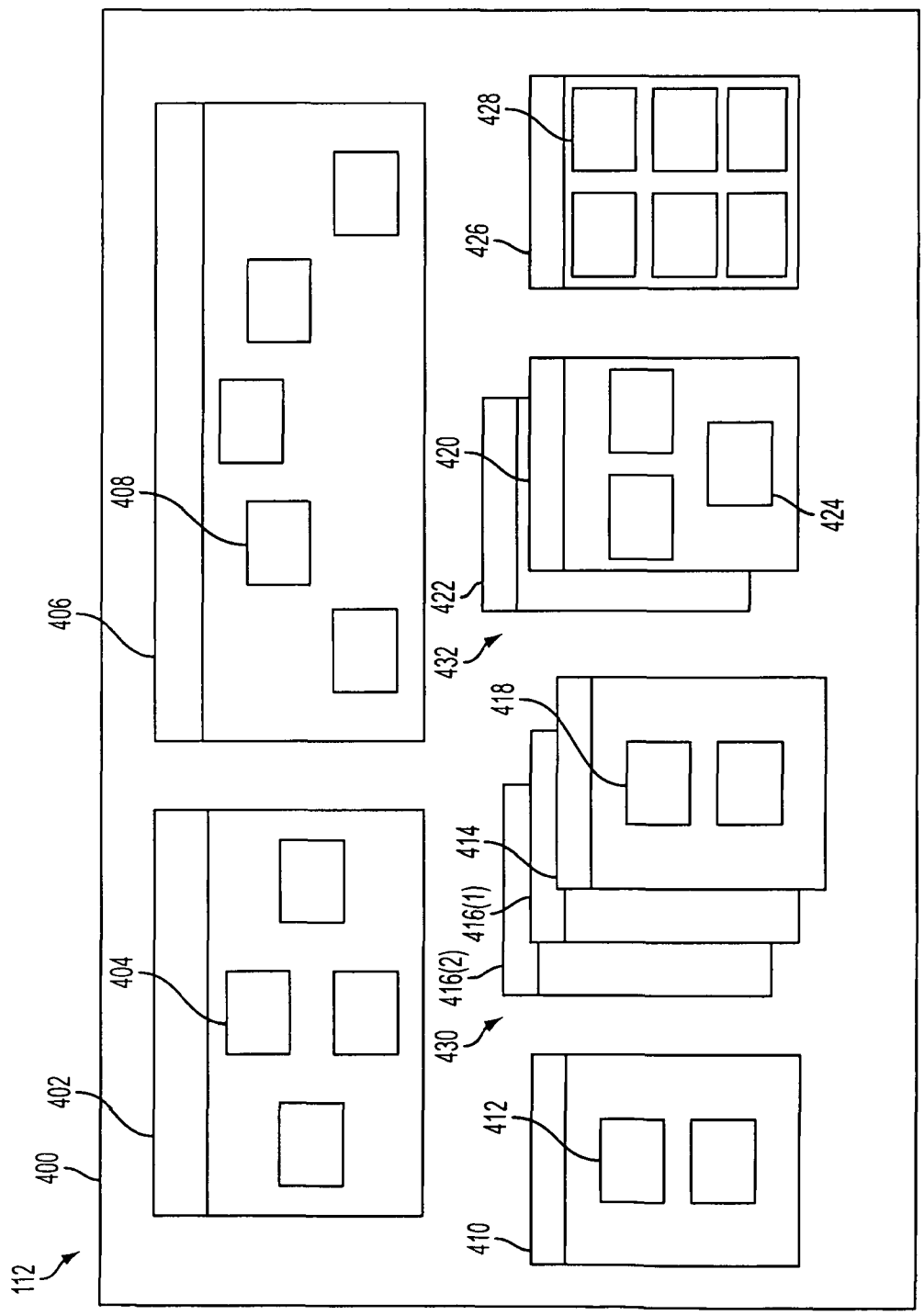
FIG. 4 illustrates a display with an exemplary spatial interface.

FIG. 4 shows a display 112 that includes an exemplary spatial interface 400. The exemplary spatial interface 400 includes object viewers 402, 406, 410, 414, 416(1), 416(2), 420, 422, and 426 that are placed directly on the exemplary spatial interface 400. The object viewers 402, 406, 410, 414, 420, and 426 illustrate multiple property viewers embedded within, with an exemplary property viewer 404, 408, 412, 418, 424, and 428 being labeled for each, respectively.

The exemplary spatial interface 400 additionally includes spatial stacks 430 and 432. The spatial stack 430 includes an in-focus object viewer 414 on top of the spatial stack 430 and two out-of-focus object viewers 416(1) and 416(2) beneath. Similarly, the spatial stack 432 includes an in-focus object viewer 420 on top of the spatial stack 432 and one out-of-focus object viewer 422 beneath. The in-focus object viewer 414 and the in-focus object viewer 420 are considered in-focus as a result of being on top of spatial stacks 430 and 432, respectively. The out-of-focus object viewers 416(1), 416(2), and 422 are considered out-of-focus by virtue of not being on top of spatial stacks 430 or 432. In various embodiments, a spatial interface such as the exemplary spatial interface 400 allows a user to navigate within spatial stacks 430 and 432, for example, to change which object viewer is in-focus or out-of-focus. Additionally, in various embodiments, a spatial interface such as the exemplary spatial interface 400 allows a user to add object viewers to the spatial stacks 430 and 432. In a typical embodiment, the object viewers in a spatial stack represent a history of a user's viewing. Various embodiments of spatial stacks will be discussed in further detail relative to FIG. 7.

Figure 5A:
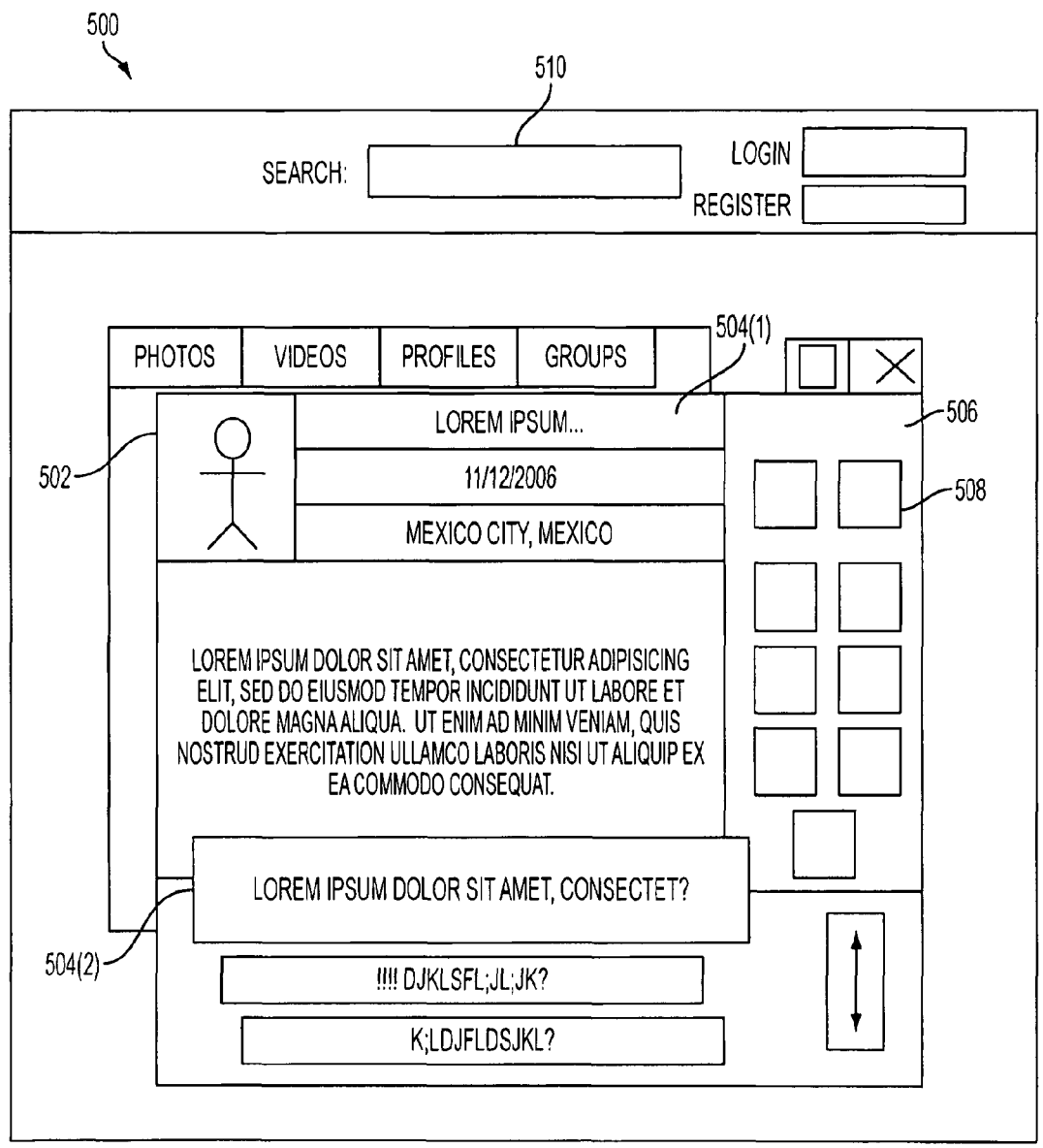
FIG. 5A illustrates an exemplary spatial interface.

FIG. 5A illustrates an exemplary spatial interface 500 with specific reference to an object viewer 502. The object viewer 502 includes primitive property viewers 504(1) and 504(2) being used for displaying text properties and a relation property viewer 506 that displays a plurality of related objects. For purposes of simplicity, only one related object 508 is labeled. Referring now to FIG. 5A in conjunction with FIG. 1, a search form 510 may be used, for example, to add object viewers to the spatial interface 500. By entering a search string into the search form 510, a universe of objects managed by the object handler 106 may be searched and objects may be selected and returned to the spatial interface application 110 for adding to the spatial interface 500 in the manner described above with respect to FIG. 3A.

In various embodiments, spatial components, including object viewers and property viewers, may exist in various content states, a content state being used to determine the extent to which a spatial component's content is exposed on the spatial interface. Typically, a content state begins with an object viewer and is propagated to embedded property viewers. The content state, however, is treated differently depending on whether an object viewer is in a particular content state or a property viewer is in the particular content state.

For example, a spatial interface may support passive, preview, and activated content states. Correspondingly, object viewers may, for example, be configured to support passive, preview, or activated content states. A passive content state may be considered a state in which minimum content that is necessary to differentiate the object being represented by the object viewer is displayed, that is, displaying the minimum necessary to distinguish one object from any other object of that type. An object viewer may be in a passive content state, for example, when the object viewer is in the embedded context. A preview content state may be considered a state in which, for example, a representative property from an object such as a text name or a photograph thumbnail is displayed. An activated content state may be considered a state in which all properties are displayed such as, for example, when an object viewer is a top-level object viewer on the spatial interface. In a typical embodiment, content that is displayed in a particular content state is defined by the object viewer and therefore is object-viewer-specific.

Figure 5B:
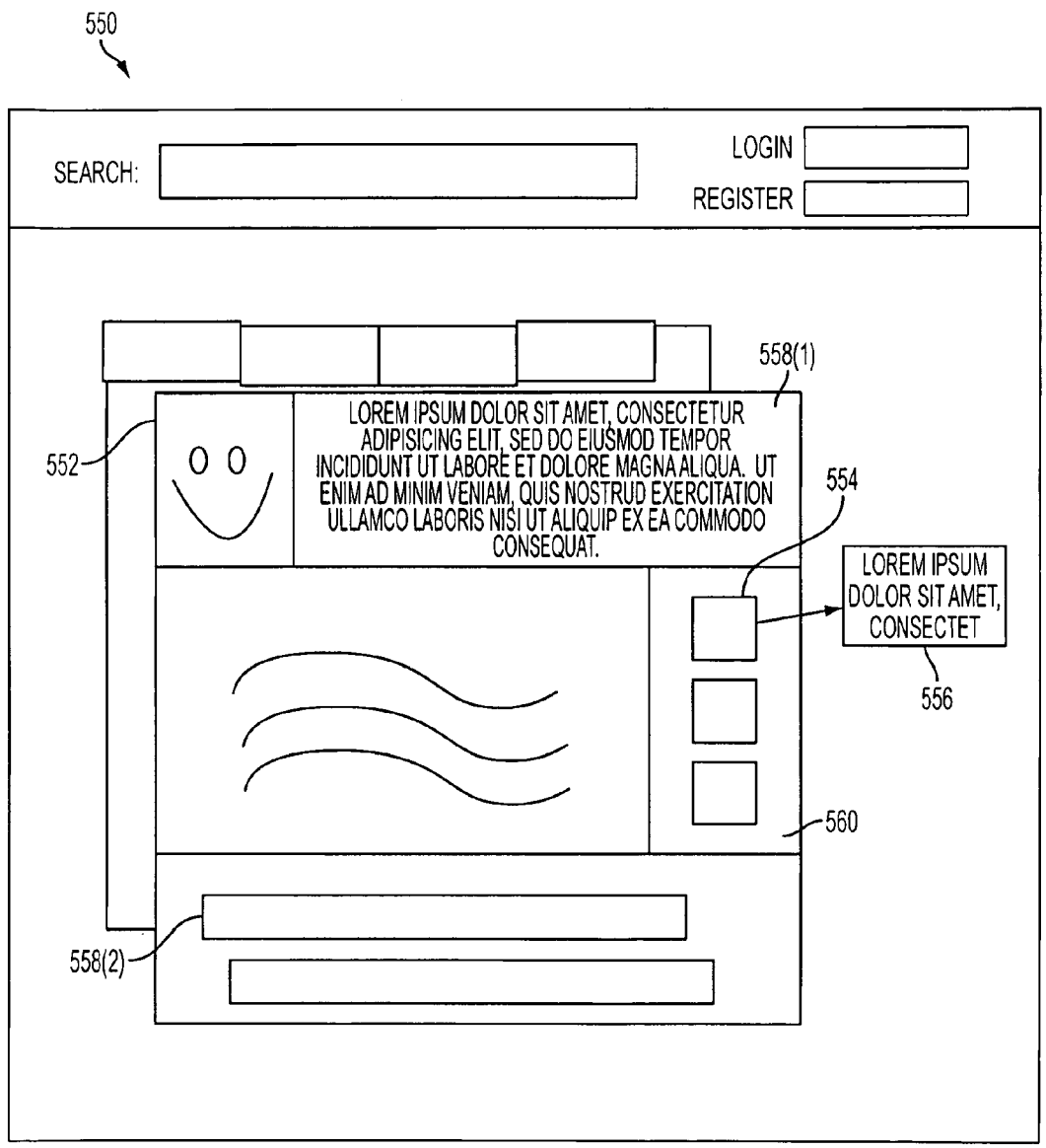
FIG. 5B illustrates an exemplary spatial interface.

FIG. 5B illustrates an exemplary spatial interface 550. An object viewer 552 is an object viewer in the top-level context and is, thus, in an activated content state. In the activated state, the object viewer 552 shows, for example, embedded primitive property viewers 558(1) and 558(2) and embedded relation property viewer 560. Embedded object viewer 554 is embedded within the embedded relation property viewer 560 and is shown to be in a preview state by displaying a representative text property 556. The preview state may be initiated, for example, by a user hovering over the embedded object viewer 554 with a mouse cursor. In various other embodiments, a preview state of an object viewer may display a thumbnail photograph, an identification number or the like.

FIG. 6 illustrates a spatial interface 600 for manipulation of object viewers according to a typical embodiment. As illustrated, object viewers 602, 604, and 610 are in the top-level context. In various embodiments, the object viewers may be manipulated only in the top-level context. Initially, prior to manipulation, a property viewer 606 is embedded within the object viewer 604. However, the spatial interface 600 permits a user to add properties to spatial components. In that way, a user may drag, using, for example, a mouse or a touch screen, the property viewer 606 from the object viewer 604 to the object viewer 602. Once the property viewer 606 is dropped onto the object viewer 602, the property viewer 606 is added and embedded within the object viewer 602 and effectively moved from the object viewer 604. Referring back to FIG. 1, at this point, the spatial interface application 110 communicates the change to the object handler 106. The object handler 106 then performs a corresponding update on the data store 104.

Also shown in FIG. 6, in a similar manner, the object viewer 610 may be dragged onto the relation property viewer 608. Initially, the object viewer 610 is in the top-level context. Upon being dropped onto the relation property viewer 608, the object viewer 610 becomes related to the object viewer 602 and appears in the embedded context. The spatial interface application 110 then communicates the change to the object handler 106. The object handler subsequently performs a corresponding update on the links table 204 in the data store 104. One of ordinary skill in the art will recognize that object viewers such as the object viewer 602 may similarly be moved from the embedded context to the top-level context using a reverse procedure to that described above. Additionally, in various embodiments, object viewers such as the object viewer 602 may be temporarily be moved for purposes of providing a user a preview and an option to make the move permanent.

In various embodiments, object viewers such as the object viewer 602 may be designated to be static so that the object viewer 602 cannot accept new properties. One of ordinary skill in the art will recognize an object viewer such as object viewer 602 may be designated static as a performance optimization. In other embodiments, object viewers such as the object viewer 602 may be given an option according to a predetermined algorithm whether to accept a new property viewer such as the property viewer 606.

Figure 7:
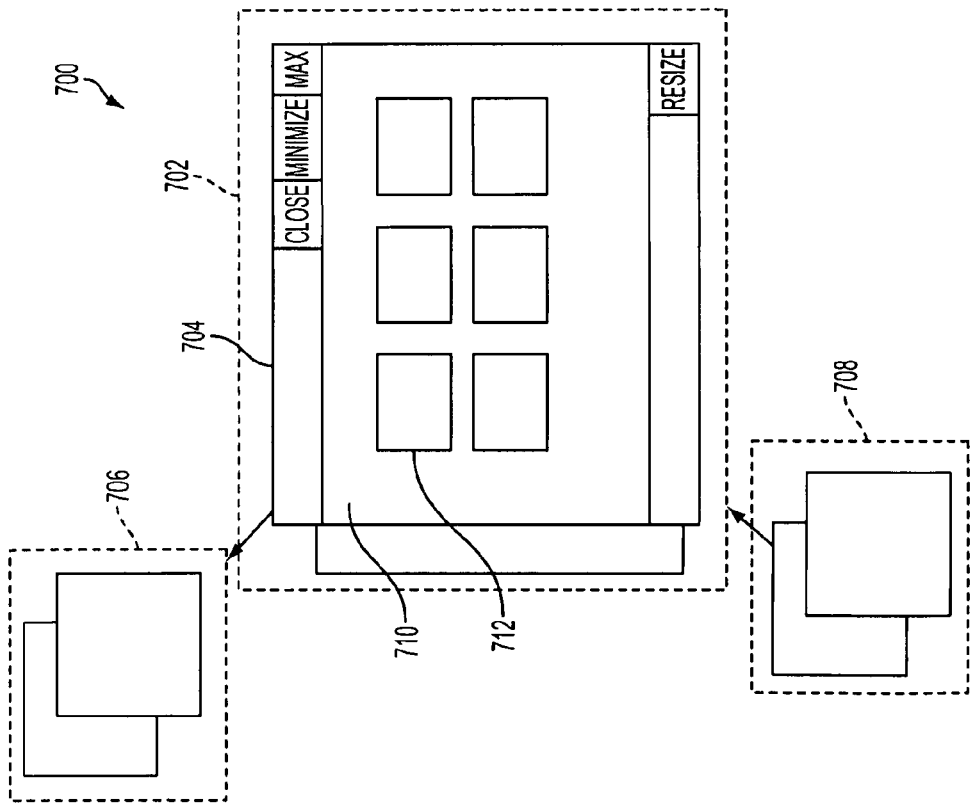
FIG. 7 illustrates an exemplary spatial interface.

FIG. 7 illustrates an exemplary spatial interface 700. As illustrated in FIG. 7, the exemplary spatial interface 700 includes an in-focus object viewer 704 within a spatial stack 702. Spatial stacks such as, for example, the spatial stack 702 facilitate viewing of related object viewers and are typically fluid so that a user may add or remove object viewers from the spatial stack. For example, when a user selects an embedded object viewer 712 within a relation property viewer 710, the relation property viewer is added to the spatial stack 702. Object viewers may also be removed from spatial stacks, for example, by dragging object viewers off of the spatial stack. For example, object viewers 706 illustrate object viewers being removed from the spatial stack 702 and object viewers 708 indicate object viewers being added to the spatial stack 702. In contrast to the manipulation of object viewers described relative to FIG. 6, spatial stacks such as spatial stack 702 only serve a purpose of presenting information to a user. Generally, no updates are performed on the data store 104 as a result of a user adding object viewers 708 to the spatial stack 702.

Figure 8:
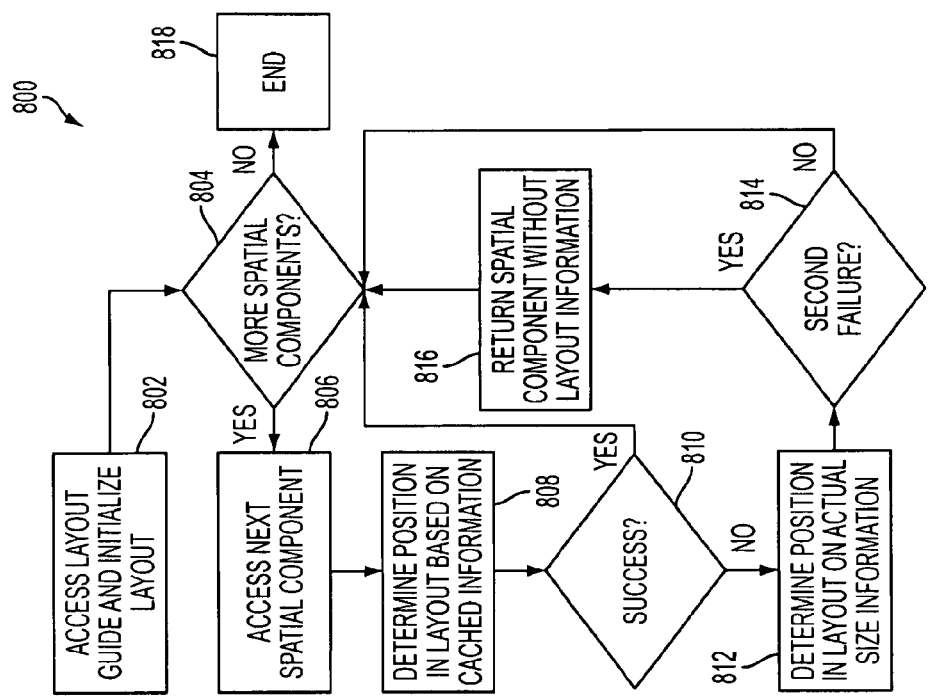
FIG. 8 illustrates a layout process flow.

FIG. 8 illustrates a process flow 800 for placing spatial components on a layout, as may be followed by the spatial interface application 110. Because the process flow 800 is applicable for any placement of spatial components including, for example, placement of object viewers on a spatial interface, placement of object viewers within a relation property viewer, and placement of property viewers within an object viewer. Therefore, in the flow 800, spatial components are referred to generically as being placed in a layout for a container. The container may be, for example, a spatial interface, an object viewer, or a relation property viewer. One of ordinary skill in the art will recognize that the spatial components may vary unpredictably in size and importance. Therefore, under such circumstances, one of ordinary skill in the art will further recognize that the process flow 800 described herein may be highly advantageous.

At step 802, the spatial interface application 110 initializes a layout by accessing a generalized layout guide for placement of spatial components. The flow 800 generally begins with the spatial interface application having a stack of spatial components for placement in the container. The generalized layout guide facilitates the placement of spatial components in the container by moving across the container in a predetermined direction as spatial components are placed. For example, in some embodiments, the generalized layout guide starts in the center of the layout and moves outward. In other embodiments, for example, the generalized layout guide moves left-to-right and top-to-bottom. One of ordinary skill in the art will recognize that not all layouts are identical. However, the generalized layout guide maintains consistency across layouts through the direction of movement. At step 804, if the stack of spatial components is not empty, the spatial interface application proceeds to step 806 and removes the next spatial component from the stack.

At step 808, the spatial interface application 110 places the spatial component in the layout based on information provided in the generalized layout guide and cached information regarding, for example, an object type. In various embodiments, the cached information is developed from previous iterations of the flow 800. The cached information includes, for example, historical size and placement information based on a type (e.g. object type) and context (e.g., embedded context) of the spatial component being placed. The size information includes, for example, height and width of a space that has previously been allocated for a spatial component of the same type for the same context. Placement is based on a best-fit analysis considering factors such as the size information and available space in the container. In some embodiments, the object viewers are strategically positioned in the stack according to priority so that, in the flow 800, the spatial interface application 110 places object viewers with a high priority first.

At step 810, if the spatial component being placed is successfully placed in the layout, layout information is passed to the container and the flow 800 returns to step 804 for a determination of whether any spatial components remain in the stack. If the spatial component being placed is not successfully placed in the layout at step 810, at step 812, the spatial interface application 110 attempts to place the spatial component in the layout based on actual size information for the spatial component being placed rather than the cached information. At step 814, if there is a second failure, the spatial interface application 110 returns the spatial component to the container without layout information at step 816 and the flow 800 returns to step 804 for a determination of whether any spatial components remain in the stack. Alternatively, if there is not a second failure, layout information is passed to the container and the flow 800 returns directly to step 804. The process flow 800 continues until the stack of spatial components is empty, in which case the flow 800 ends at step 818.

One of ordinary skill in the art will recognize numerous applications for the principles disclosed herein. For example, a spatial interface may be utilized as an internet portal, a social networking interface, or a media service interface for providing movies, photos, music, and the like. Many other applications are also contemplated and will be apparent to one of ordinary skill in the art.

Figure 9:
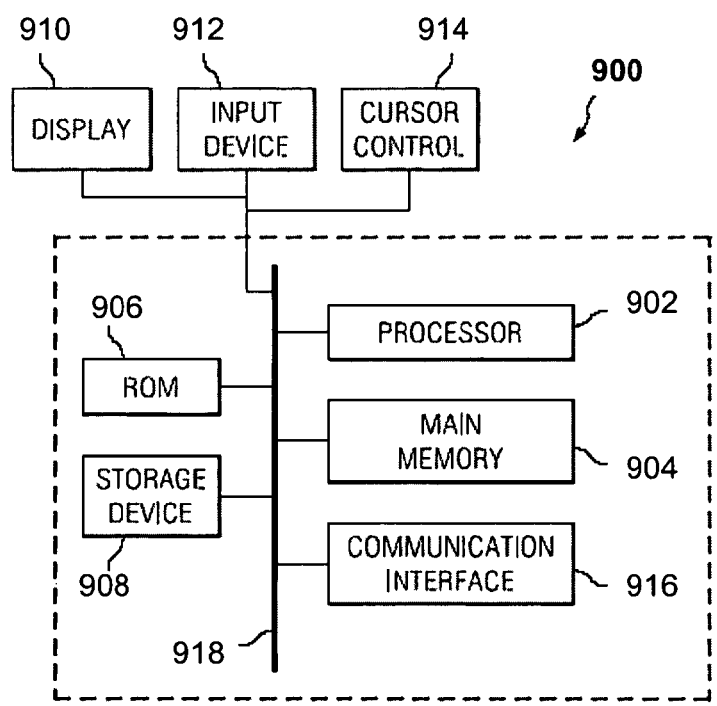
FIG. 9 illustrates an embodiment of a computer on which various embodiments of the invention may be implemented.

FIG. 9 illustrates an embodiment of a computer on which various embodiments of the invention may be implemented, including an object storage system 102 and a spatial interface system 108. One of ordinary skill in the art will recognize that characteristics described below relative to the computer are equally applicable to a smartphone, personal digital assistant (PDA) and the like. In the implementation, a computer 900 may include a bus 918 or other communication mechanism for communicating information and a processor 902 coupled to the bus 918 for processing information. The computer 900 also includes a main memory 904, such as random access memory (RAM) or other dynamic storage device, coupled to the bus 918 for storing instructions by the processor 902.

The main memory 904 also may be used for storing temporary variables or other intermediate information during execution of the instructions to be executed by the processor 902. The computer 900 further includes a read only memory (ROM) 906 or other static storage device coupled to the bus 918 for storing static information and instructions for the processor 902. A computer readable storage device 908, such as a magnetic disk or optical disk, is coupled to the bus 918 for storing information and instructions for the processor 902. The computer 900 may be coupled via the bus 918 to a display 910, such as a liquid crystal display (LCD) or a cathode ray tube (CRT), for displaying information to a user. An input device 912, including, for example, alphanumeric and other keys, is coupled to the bus 918 for communicating information and command selections to the processor 902. Another type of user input device is a cursor control 914, such as a mouse, a trackball, or cursor direction keys for communicating direct information and command selections to the processor 902 and for controlling cursor movement on the display 910. The cursor control 914 typically has two degrees of freedom in two axes, a first axis (e.g., x) and a second axis (e.g., y), that allow the device to specify positions in a plane. In various embodiments, the input device 912 may also be combined with the display 910 in the form of a touch screen.

The term "computer readable instructions" as used above refers to any instructions that may be performed by the processor 902 and/or other component of the computer 900. Similarly, the term "computer readable medium" refers to any storage medium that may be used to store the computer readable instructions. Such a medium may take many forms, including, but not limited to, non volatile media, volatile media, and transmission media. Non-volatile media include, for example, optical or magnetic disks, such as the computer readable storage device 908. Volatile media include dynamic memory, such as the main memory 904. Transmission media include coaxial cables, copper wire and fiber optics, including wires of the bus 918. Transmission media can also take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer readable media may be involved in carrying one or more sequences of one or more instructions to the processor 902 for execution. For example, the instructions may initially be borne on a magnetic disk of a remote computer. The remote computer can load the instructions into its dynamic memory and send the instructions over a telephone line using a modem. A modem local to the computer 900 can receive the data on the telephone line and use an infrared transmitter to convert the data to an infrared signal. An infrared detector coupled to the bus 918 can receive the data carried in the infrared signal and place the data on the bus 918. The bus 918 carries the data to the main memory 904, from which the processor 902 retrieves and executes the instructions. The instructions received by the main memory 904 may optionally be stored on the computer readable storage device 908 either before or after execution by the processor 902.

The computer 900 may also include a communication interface 916 coupled to the bus 918. The communication interface 916 provides a two-way data communication coupling between the computer 900 and a network, such as the network 116 of FIG. 1B. For example, the communication interface 916 may be an integrated services digital network (ISDN) card or a modem used to provide a data communication connection to a corresponding type of telephone line. As another example, the communication interface 916 may be a local area network (LAN) card used to provide a data communication connection to a compatible LAN. Wireless links may also be implemented. In any such implementation, the communication interface 916 sends and receives electrical, electromagnetic, optical, or other signals that carry digital data streams representing various types of information. The computer readable storage device 908 can further include instructions for carrying out various processes for image processing as described herein when executed by the processor 902. The computer readable storage device 908 can further include a database for storing data relative to same.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:

accessing, by an object storage system comprising computer hardware, at least a portion of a stored universe of data as a particular object of a particular object type;

wherein the accessing is based, at least in part, on a mapping of the stored universe of data to a plurality of objects according to a universal representation format, each object of the plurality of objects belonging to an object type of a plurality of object types defined by the universal representation format;

wherein the accessing comprises identifying a related object of the plurality of objects, the related object being identified in memory of the object storage system as related to the particular object;

wherein the particular object comprises a relation property, the relation property comprising information about the related object; and transmitting the particular object to an interface application for rendering on a user interface according to the universal representation format, the interface application being configured according to the universal representation format.

2. The method of claim 1, comprising:

receiving, from the interface application, at least one manipulation for the particular object; and updating, by the object storage system, the stored universe of data and the particular object responsive to the receiving.

3. The method of claim 1, wherein the interface application is loaded on a remote electronic device and the transmitting comprises transmitting the particular object to the remote electronic device.

4. The method of claim 1, wherein the interface application is loaded as a desktop application on the object storage system.

5. A system comprising:

a data store that stores a universe of data; and a computing device that executes instructions to:

access, by an object storage system comprising computer hardware, at least a portion of a stored universe of data as a particular object of a particular object type;

wherein the access is based, at least in part, on a mapping of the stored universe of data to a plurality of objects according to a universal representation format, each object of the plurality of objects belonging to an object type of a plurality of object types defined by the universal representation format;

wherein the access comprises identification of a related object of the plurality of objects, the related object being identified in memory of the object storage system as related to the particular object;

wherein the particular object comprises a relation property, the relation property comprising information about the related object; and transmit the particular object to an interface application for rendering on a user interface according to the universal representation format, the interface application being configured according to the universal representation format.

6. A method for universal presentation of data, the method comprising:

receiving, on an electronic device, a particular object of a particular object type from a storage system comprising a universe of data, the particular object encapsulating at least a portion of the universe of data;

wherein the storage system maps the universe of data to a plurality of objects according to a universal representation format, each object of the plurality of objects belonging to an object type of a plurality of objects types defined by the universal representation format;

wherein the particular object comprises a relation property, the relation property including information about a related object of the plurality of objects, the related object being identified in memory of the storage system as related to the particular object;

rendering a representation of the particular object on a user interface, the user interface comprising a first object viewer for the particular object, a relation property viewer for the relation property and a second object viewer for the related object;

wherein the rendering comprises:

embedding the relation property viewer within the first object viewer; and embedding the second object viewer within relation property viewer.

7. The method of claim 6, comprising identifying the particular object with the first object viewer based, at least in part, on the particular object type, wherein the first object viewer is configured to display, according to the universal representation format, the particular object type.

8. The method of claim 6, wherein the rendering comprises rendering, via the first object viewer at least some data encapsulated by the particular object.

9. The method of claim 8, wherein:

the user interface comprises a plurality of spatial components, the plurality of spatial components comprising the first object viewer, the second object viewer and the relation property viewer; and the plurality of spatial components are organized in a hierarchical structure.

10. The method of claim 9, wherein:

the user interface comprises a spatial stack, the spatial stack including ones of the plurality of spatial components; and the spatial stack is indicative of a viewing history of a user.

11. The method of claim 6, comprising:

receiving a manipulation for the at least one object viewer; and transmitting the manipulation to the storage system for a corresponding update relative to the at least one object identified with the at least one object viewer.

12. The method of claim 6, wherein the user interface supports a plurality of content states for the first object viewer.

13. The method of claim 12, wherein the plurality of content states are selected from the group consisting of temporary, activated, and passive.

14. The method of claim 9, wherein:

the particular object comprises a primitive property; and the primitive property is displayed in the user interface by a primitive property viewer.

* * * * *